(12) United States Patent
Shin et al.

(10) Patent No.: US 11,676,505 B2
(45) Date of Patent: Jun. 13, 2023

(54) SIMULATION SYSTEM AND METHOD FOR DIRECTION FINDING MEASURE OF PERFORMANCE USING REAL AVIONICS ELECTRONIC WARFARE OPERATION

(71) Applicant: AGENCY FOR DEFENSE DEVELOPMENT, Daejeon (KR)

(72) Inventors: Dongcho Shin, Daejeon (KR); Jeungmin Joo, Daejeon (KR); Jeongho Ryu, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 499 days.

(21) Appl. No.: 16/864,524

(22) Filed: May 1, 2020

(65) Prior Publication Data
US 2021/0035466 A1 Feb. 4, 2021

(30) Foreign Application Priority Data
Jul. 30, 2019 (KR) .................. 10-2019-0092679

(51) Int. Cl.
*G09B 9/00* (2006.01)
*G09B 9/20* (2006.01)
(52) U.S. Cl.
CPC ............. *G09B 9/003* (2013.01); *G09B 9/206* (2013.01)
(58) Field of Classification Search
CPC ...................................... G09B 9/206
See application file for complete search history.

(56) References Cited

U.S. PATENT DOCUMENTS 4,192,082 A * 3/1980 Deaton ................... G09B 9/003
342/13

FOREIGN PATENT DOCUMENTS

| KR | 10-2010-0052698 A | 5/2010 |
| KR | 10-1315531 B1 | 10/2013 |
| KR | 10-2014-0112811 A | 9/2014 |
| KR | 10-2015-0011630 A | 2/2015 |
| KR | 10-1765174 B1 | 8/2017 |
| KR | 10-2018-0083174 A | 7/2018 |

* cited by examiner

*Primary Examiner* — Timothy A Musselman
(74) *Attorney, Agent, or Firm* — Scully, Scott, Murphy & Presser, P.C.

(57) ABSTRACT

The present disclosure relates to an avionics electronic warfare simulation apparatus and a control method thereof. The avionics electronic warfare simulation apparatus includes an electromagnetic wave generator that generates a virtual electromagnetic wave by using at least one of a plurality of electronic warfare threat models, an electronic warfare engagement simulation unit that simulates an operation of an aircraft according to a preset operation scenario to engage the electromagnetic wave and the aircraft based on the operation scenario, and a direction finding simulation unit that performs direction finding using the electromagnetic wave based on a plurality of antennas mounted on the aircraft to output direction finding result information.

13 Claims, 10 Drawing Sheets

SIMULATION SYSTEM AND METHOD FOR DIRECTION FINDING MEASURE OF PERFORMANCE USING REAL AVIONICS ELECTRONIC WARFARE OPERATION

CROSS-REFERENCE TO RELATED APPLICATION

Pursuant to 35 U.S.C. § 119(a), this application claims the benefit of the earlier filing date and the right of priority to Korean Patent Application No. 10-2019-0092679, filed on Jul. 30, 2019, the contents of which is incorporated by reference herein in its entirety.

BACKGROUND

1. Technical Field

The present disclosure relates to an avionics electronic warfare simulation apparatus and a control method thereof, and more particularly, to propose a simulation system and method for direction finding measure of performance using real avionics electronic warfare operation.

2. Description of the Related Art

Electronic warfare is generally subdivided into an electronic attack, electronic protection, and electronic support.

When an electronic attack (EA) is to neutralize opponent's electronic equipment by using electromagnetic waves, electronic protection (EP) means all activities to protect one's electronic equipment from the opponent's electronic attack, and electronic support (ES) refers to collecting and analyzing electromagnetic spectrum energy to recognize threats, and supporting electronic warfare activities through threat location analysis, signal analysis, and wiretapping.

Direction finding (DF) technology is a technology to find a direction of communication equipment using electromagnetic waves, guided weapons, or radars tracking targets by using electromagnetic waves, and is a core of electronic support (ES) equipment. Direction information obtained by the technology is used as preprocessing data of a signal processor to improve an efficiency of signal analysis or to be used in electronic attack (EA) equipment to enable effective electronic attack.

Particularly in a field of avionics electronic warfare, a pre-simulation analysis is essential as the direction finding technology is a major element of system major measure of performance (MOP) to eliminate a risk of development that may be inherent in a development of a direction finding device during system development by studying in advance a possibility of satisfying the direction finding performance and selecting an operational aircraft before system development.

In this regard, the prior arts are limited to simply presenting a method of selecting positions of antennas, and not presenting the measure of performance reflecting an actual operating environment by interlocking electronic warfare engagement-level simulation system based on various electronic warfare threat environment by using a target aircraft model based on an actual avionics electronic warfare system operation before system development.

SUMMARY

The present disclosure is directed to solving the aforementioned problems and other drawbacks.

The present disclosure provides an avionics electronic warfare simulation apparatus and a control method thereof capable of analyzing a direction finding measure of performance using real avionics electronic warfare operation.

The present disclosure provides an avionics electronic warfare simulation apparatus and a control method thereof.

The avionics electronic warfare simulation apparatus includes: an electromagnetic wave generator that generates a virtual electromagnetic wave by using at least one of a plurality of electronic warfare threat models; an electronic warfare engagement simulation unit that simulates an operation of an aircraft according to a preset operation scenario to engage the electromagnetic wave and the aircraft based on the operation scenario; and a direction finding simulation unit that performs direction finding using the electromagnetic wave based on a plurality of antennas mounted on the aircraft to output direction finding result information.

According to one embodiment, the direction finding result information may include azimuth and elevation based on a position of the aircraft.

According to one embodiment, the direction finding simulation unit may perform direction finding on a plurality of candidates in which the antennas are disposed at different positions in the aircraft, and the direction finding result information may include notification information notifying any one candidate in which the direction finding error is a minimum in the plurality of candidates.

According to one embodiment, the electronic warfare engagement simulation unit may set at least one between a number of antennas and a disposed position of each antenna based on a user input, and may generate a candidate of either one corresponding to the user input to include the candidate in the plurality of candidates.

According to one embodiment, the electronic warfare engagement simulation unit may simulate an operation of the aircraft by changing a total number of meshes constituting the aircraft based on a characteristic of the electromagnetic wave.

According to one embodiment, the total number of meshes may increase as a frequency of the electromagnetic wave increases.

According to one embodiment, the total number of meshes may decrease as a magnitude of the electromagnetic wave increases.

According to one embodiment, the electronic warfare engagement simulation unit may change at least one between a total number of antennas and a disposed position of each antenna based on the total number of meshes constituting the aircraft.

According to one embodiment, the electronic warfare engagement simulation unit may arrange the antennas in an order starting from a point with a largest average value of angles formed by neighboring meshes.

In addition, according to one embodiment, a method for controlling an avionics electronic warfare simulation apparatus may include: generating a virtual electromagnetic wave by using at least one of a plurality of electronic warfare threat models; simulating an operation of an aircraft according to a preset operation scenario to engage the electromagnetic wave and the aircraft based on the operation scenario; and outputting direction finding result information by performing direction finding using the electromagnetic wave based on a plurality of antennas mounted on the aircraft.

According to one embodiment, the outputting direction finding result information may include: performing direction finding on a plurality of candidates in which the antennas are disposed at different positions in the aircraft; and outputting direction finding result information on each of the plurality of candidates, wherein the direction finding result information may include notification information notifying any one candidate in which the direction finding error is a minimum in the plurality of candidates.

According to one embodiment, the method may further include: setting at least one between a number of antennas and a disposed position of each antenna based on a user input; and generating a candidate of either one corresponding to the user input to include the candidate in the plurality of candidates.

According to one embodiment, the simulating an operation of an aircraft according to a preset operation scenario to engage the electromagnetic wave and the aircraft based on the operation scenario may include: changing a total number of meshes constituting the aircraft based on a characteristic of the electromagnetic wave; and simulating an operation of an aircraft according to the preset operation scenario by using the aircraft in which the total number of meshes is changed.

According to one embodiment, the total number of meshes may increase as a frequency of the electromagnetic wave increases.

According to one embodiment, the total number of meshes may decrease as a magnitude of the electromagnetic wave increases.

According to the present disclosure, the direction finding measure of performance (MOP), which is the most important in the electronic support (ES) field, may be proposed by modeling an actual operating environment based on a three-dimensional aircraft model rather than a real aircraft before development of an avionics electronic warfare apparatus.

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The present disclosure provides an avionics electronic warfare simulation apparatus and a control method thereof to propose a major system measure of performance by quantitatively and numerically measuring a direction finding performance analysis in an electronic support field in an electronic warfare weapon system based on real avionics electronic warfare system operation.

Figure 1:
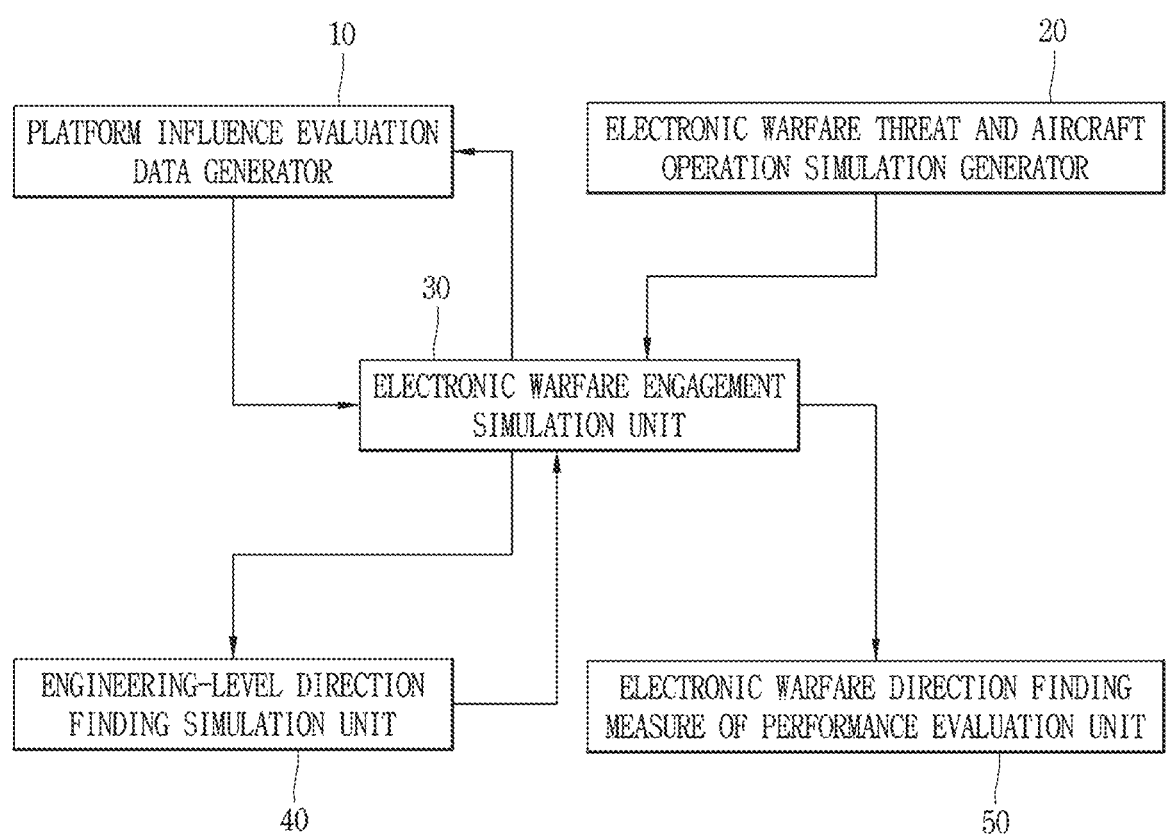
FIG. 1 is a block diagram illustrating an avionics electronic warfare simulation apparatus according to an embodiment of the present disclosure.

FIG. 1 is a block diagram illustrating an avionic warfare simulation apparatus according to an embodiment of the present disclosure.

Referring to FIG. 1, the avionic warfare simulation apparatus according to an embodiment of the present disclosure may include a platform influence evaluation data generator 10, an electronic warfare threat and aircraft operation simulation generator 20, an electronic warfare engagement simulation unit 30, and an engineering-level direction finding simulation unit 40, and an electronic warfare direction finding measure of performance evaluation unit 50.

The avionics electronic warfare simulation apparatus may be configured as a system in which each component is an individual component.

Figure 3A:
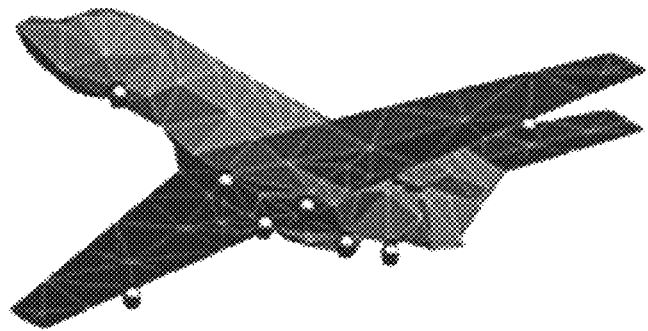
FIGS. 3A and 3B are exemplary views illustrating an example of changing a total number of meshes constituting an aircraft based on a characteristic of an electromagnetic wave.
Figure 3B:
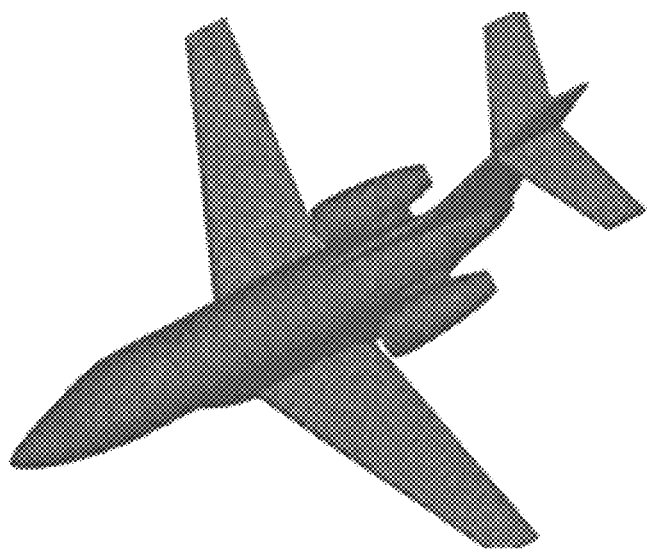
Figure 4:
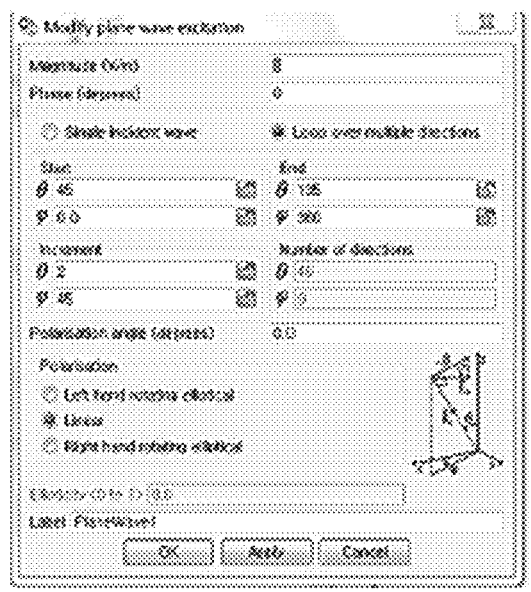
FIG. 4 is an exemplary view of an engineering-level modeling screen in which a direction finding algorithm based on an arrangement and combination of antennas is applied by the avionics electronic warfare simulation apparatus in FIG. 1.
Figure 4:
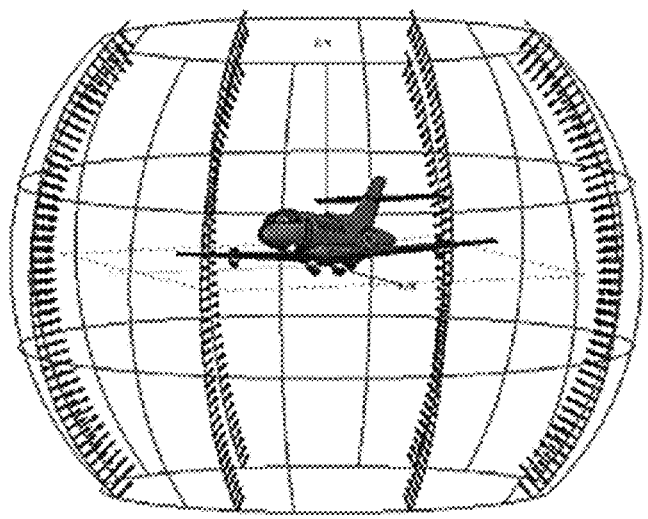

The platform influence evaluation data generator 10 may be constructed by selecting representative frequencies of a communication band (20 MHz, 80 MHz, 150 MHz, 250 MHz, 500 MHz, 800 MHz, and 1 GHz) and modeling characteristics of antennas (monopole antenna, blade antenna) arranged in a specific number on a target aircraft for system development, and by using a specific commercial SW to acquire phase information and magnitude information according to a plane wave incident angle (elevation: 45° to 135° and azimuth: 0° to 360°) as shown in FIG. 4, and to create a library on the information. Here, in order to obtain the phase information and magnitude information by easily analyzing reflection loss and three-dimensional radiation pattern of the target aircraft's frequency, data may be acquired by optimizing a simulation time by partially regulating a number of meshes by frequency as shown in FIG. 3. The data generated in this manner is stored in the library as raw data as shown in the signal generator of FIG. 9, and transferred as an input value of the engineering-level direction finding simulation unit by being interlocked with the electronic warfare engagement simulation unit.

The electronic warfare threat and aircraft operation simulation generator 20 receives and sets simulation scenarios and/or data on aircraft, electronic warfare threats, etc., performs simulation according to the set scenarios and characteristics of weapon systems, and can be implemented as a server or a PC, or a simulation program. A simulation aircraft is representative of an aircraft that operates according to a simulation scenario, and may be controlled to move by matching an operation of an aircraft in three-dimensional space obtained from a three-dimensional visualization flight simulation apparatus of FIG. 5 into a two-dimensional space, or may be fixedly operated by receiving a simple pre-designated trajectory of the location of the simulation aircraft depending on a simulation modeling. An electronic warfare threat signal generates radio waves by disposing a plurality of electronic warfare threats on a radius of operation in the Korean Peninsula based on a virtual operation range simulated with altitude information based on DTED 2 on the WGS84 coordinate system according to the simulation scenario. Here, the electronic warfare threat refers to a radio transmission facility or equipment, and means various communication facilities, target detection/tracking facilities of guided missiles, and communication-based weapon systems. In addition, detailed information utilized in electronic warfare threats, such as locations of threats, equipment specifications of threats, frequency and modulation/encryption scheme of radio signals, an amount of power, a signal-to-noise ratio (SNR), etc., is modeled based on virtual or real information, which is already recognized, and then simulated.

Figure 5:
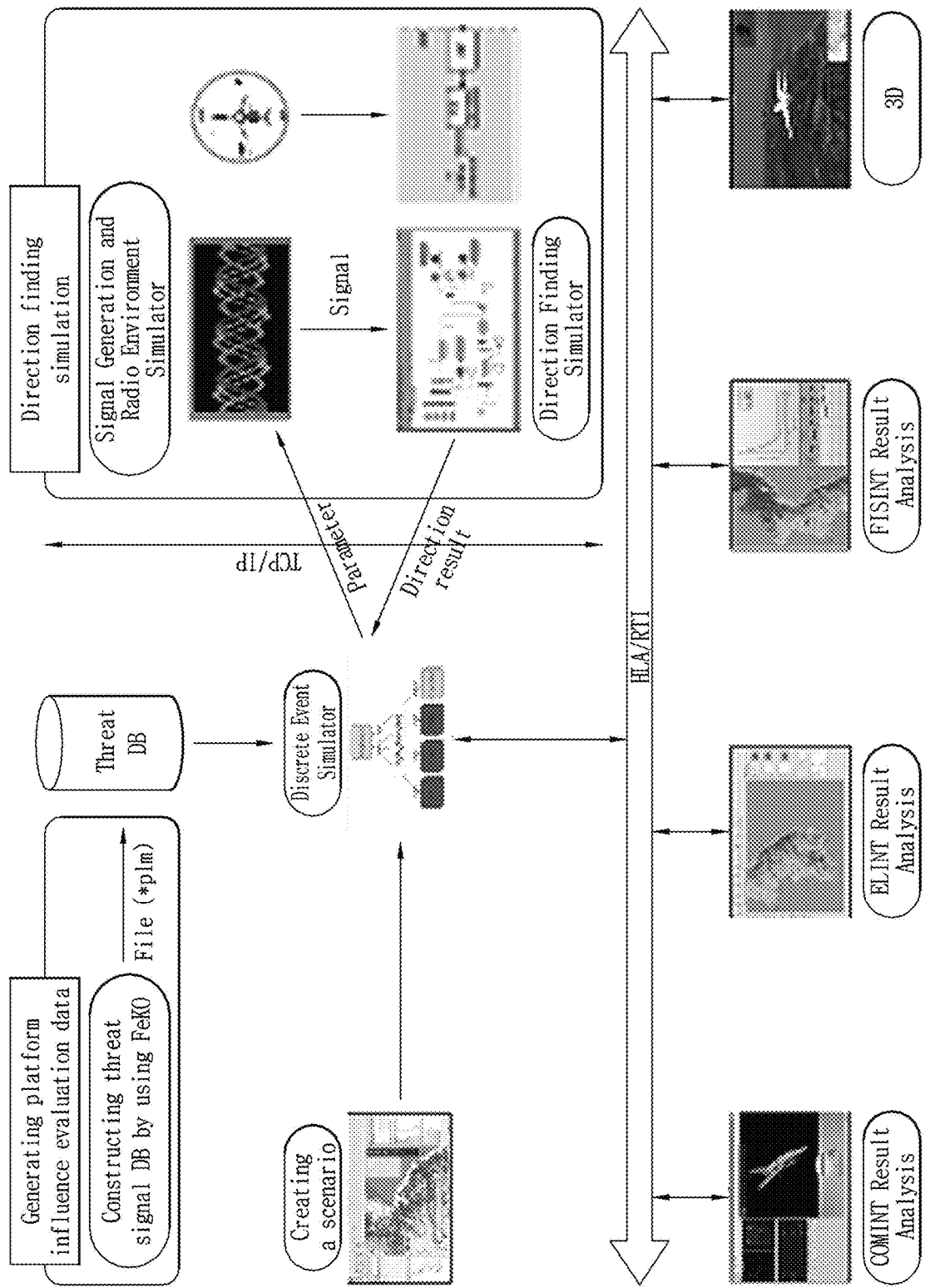
FIG. 5 is an exemplary view of setting an analysis of direction finding performance by the simulation system in FIG. 1.

The electronic warfare engagement simulation unit 30 is a module that is in charge of a central control and a control of the overall direction finding performance analysis simulation system. The electronic warfare engagement simulation unit 30 receives electronic warfare threat information and aircraft operation simulation information in a scenario from the electronic warfare threat and aircraft operation simulation generator 20 and transmits the information to the platform influence data generator 10, receives phase and magnitude information for each antenna simulated here and transmits frequency, received power, magnitudes for each antenna, phases for each antenna, signal-to-noise ratio (SNR), etc., required by the engineering-level direction finding simulation unit 40 to receive a final azimuth and elevation information, which is a result of a precise simulation based on various direction finding algorithms to be applied to the system and to transmit the information to the electronic warfare direction finding measure of performance evaluation unit 50. With the information, the electronic warfare engagement simulation unit 30 analyzes direction finding errors for each antenna arrangement to present plenty of information which may derive an optimal antenna arrangement method based on the analysis to a developer. Such interlocking scheme can be constructed to be utilized in various application fields by connecting the scheme with a simulation interlocking method based on the HLA/RTI, which is an international simulation interlocking standard, by the local area network (LAN) as illustrated in FIG. 5.

Figure 6:
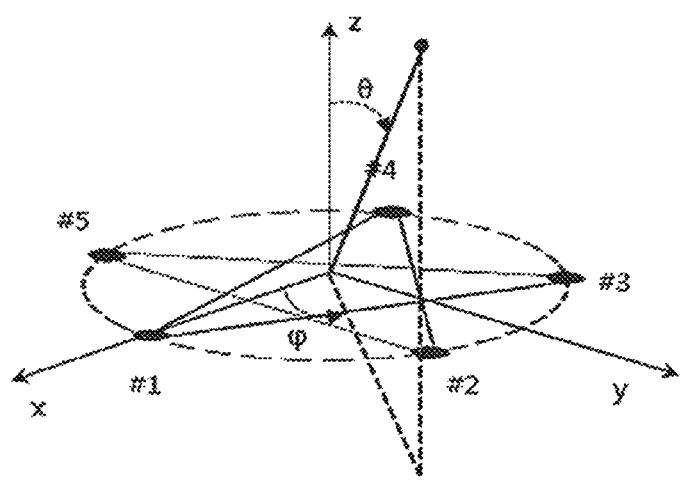
FIG. 6 is a simulation result screen illustrating three-dimensional and two-dimensional test results on various factors that are subject to specialists' comprehensive quantitative measure of performance (MOP) evaluation.
Figure 7:
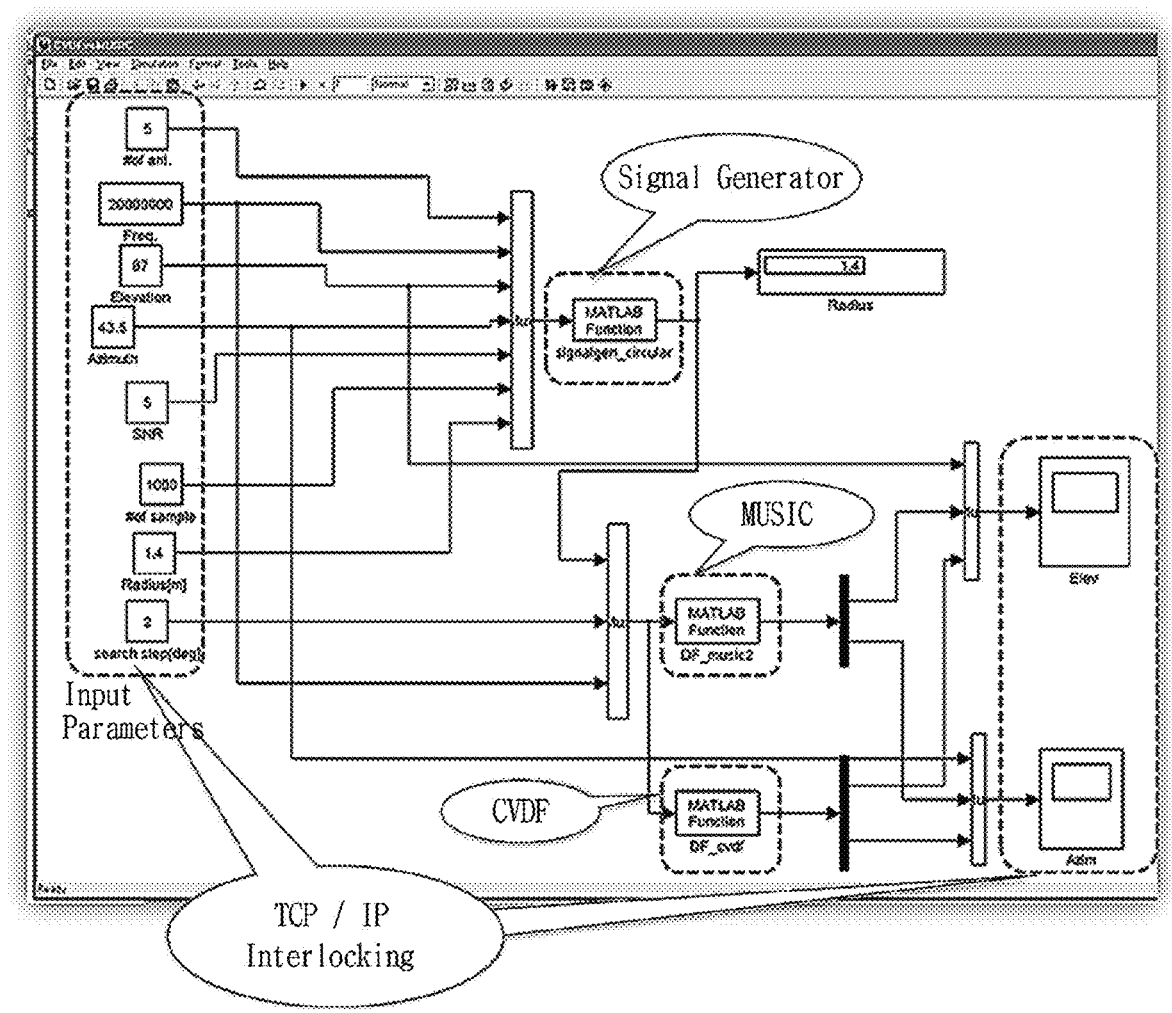
FIG. 7 is a conceptual view illustrating a direction finding algorithm based engineering-level simulator.
Figure 8:
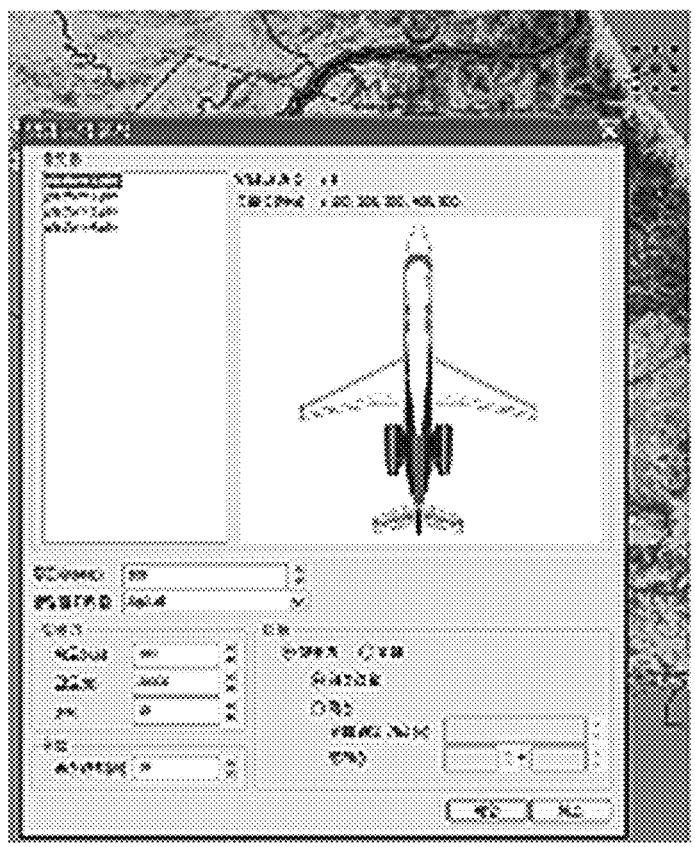
FIG. 8 is an exemplary view illustrating an example of changing a number of antennas and a disposed position of each antenna based on a user input.
Figure 8:
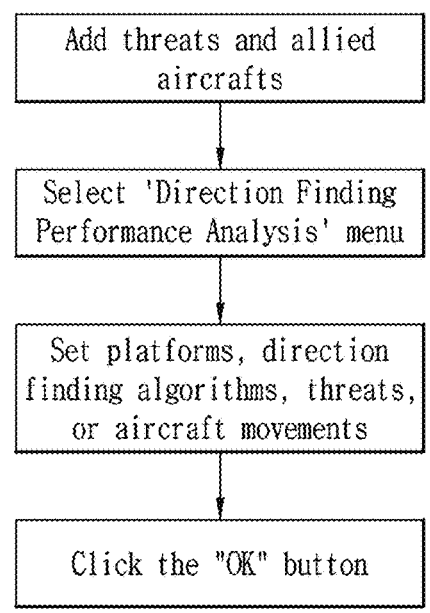
Figure 9:
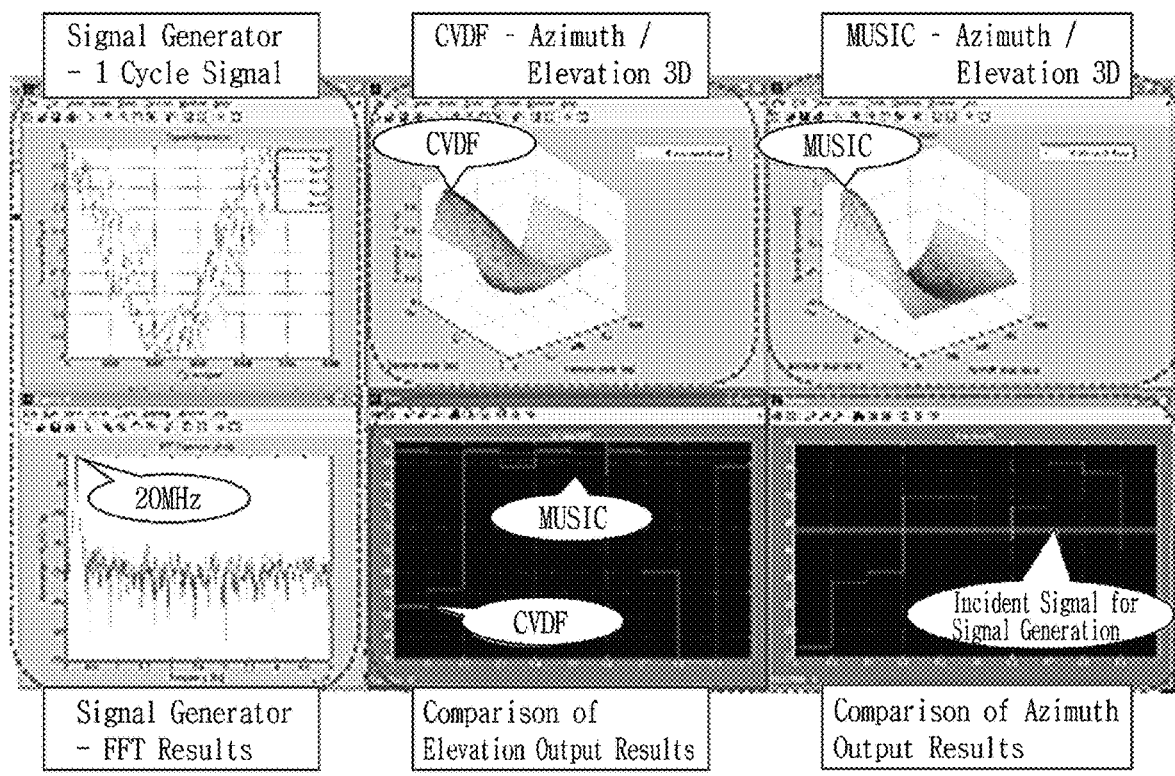
FIG. 9 is an exemplary view illustrating information included in direction finding result information.

The engineering-level direction finding simulation unit 40 has various functions to derive and analyze azimuth and elevation information for each algorithm (CVDF, MUSIC, etc.) as shown in graphs of FIG. 9 by using the direction finding algorithm based engineering-level simulator constructed as in FIG. 7 by using the frequency, the received power, magnitudes for each antenna, phases for each antenna, signal-to-noise ratio (SNR), etc. received from the above explained electronic warfare engagement simulation unit 30. Here, the engineering-level direction finding simulation unit 40 and the electronic warfare engagement simulation unit 30, which a higher engagement-level simulator, may be constructed by interlocking the heterogeneous models based on the HLA/RTI, which is the international simulation interlocking standard. Here, a coordinate setting parameter to implement the direction finding algorithm includes a number of antennas (in case of CVDF algorithm, starting from 5), and frequency (e.g., 20 to 500 MHz), elevation (0 to 90 degrees), azimuth (0 to 360 degrees), sampling frequency (e.g., fixed at 1 GHz), signal-to-noise ratio (5 to 20 dB-5 dB steps), number of samples (e.g., 1,000), and an array radius (e.g., 1.4 m) to determine the following equation when the antennas are arranged as shown in FIG. 6, search step (e.g., 2 degrees), etc.

$$\lambda = \text{wavelength} \qquad [\text{Equation 1}]$$

The electronic warfare direction finding measure of performance evaluation unit 50 may have functions to store and show comprehensive information to derive an optimal arrangement of antennas on an aircraft platform and to analyze and evaluate the operation performance through an analysis on various direction finding algorithms and detection finding errors for each arrangement of antennas through a simulation in which the platform influence evaluation data generator 10, the electronic warfare threat and aircraft operation simulation generator 20, the electronic warfare engagement simulation unit 30, and the engineering-level direction finding simulation unit 40 are interlocked one another. These experiments may derive an electronic warfare optimized direction finding measure of performance based on a real operation this is reflecting a concept of the avionics electronic warfare system operation by experimenting following steps over and over again, wherein the steps comprise: firstly generating platform influence evaluation data at a start of a simulation as in FIG. 2, setting an electronic warfare threat environment arrangement and setting an arrangement of antennas and aircraft operation data [20], operating a direction finding simulator [30], and deriving direction finding errors and evaluating MOP [40].

Figure 2:
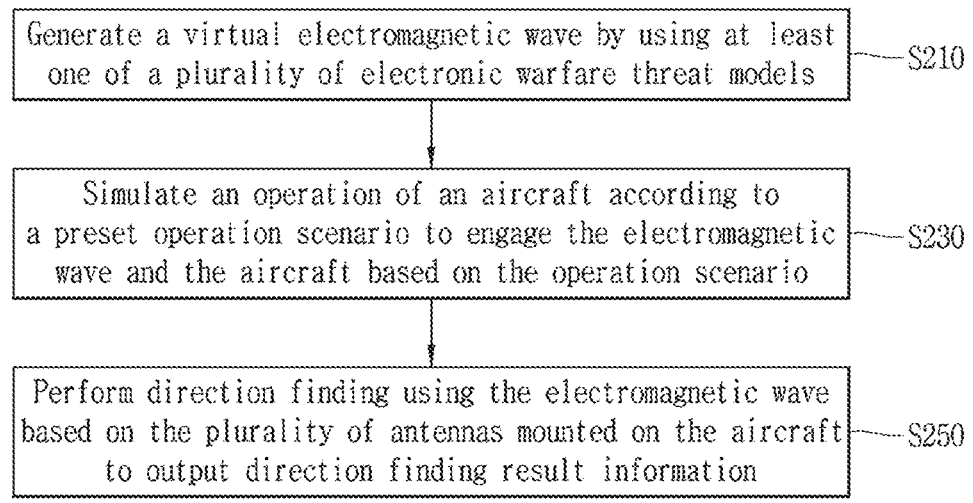
FIG. 2 is a flowchart illustrating a method for controlling the avionics electronic warfare simulation apparatus of FIG. 1.

FIG. 2 is a flowchart illustrating a control method of the avionic warfare simulation apparatus of FIG. 1.

Each step of FIG. 2 is performed by the avionics electronic warfare simulation apparatus, and may be performed by individual components constituting the avionics electronic warfare simulation apparatus.

First, the electromagnetic wave generator may generate a virtual electromagnetic wave by using at least one of a plurality of electronic warfare threat models [S210]. The electromagnetic wave generator may be the platform influence evaluation data generator 10 of FIG. 1.

For example, the electromagnetic wave generator may determine characteristics of electromagnetic wave based on a user input entered through a user interface illustrated in FIG. 4, and generate a virtual electromagnetic wave with the determined characteristics.

The characteristics of the electromagnetic wave may be defined by at least one of plane wave incident angles represented by frequency, phase, magnitude, curvature, and azimuth.

The electronic warfare engagement simulation unit 30 may simulate an operation of an aircraft according to a preset operation scenario to engage the electromagnetic wave and the aircraft based on the operation scenario.

The electronic warfare engagement simulation unit 30 may simulate an operation of the aircraft by changing a total number of meshes constituting the aircraft based on the characteristics of the electromagnetic wave.

Since a wavelength gets shorter as a frequency of the electromagnetic wave gets higher, an influence on a reflecting surface of the aircraft gets smaller. Since the influence on the reflecting surface is small, an accuracy of the simulation may be increased by increasing the total number of meshes.

On the other hand, since the wavelength gets longer as the frequency of the electromagnetic wave gets lower, the influence on the reflecting surface of the aircraft gets bigger. When the influence on the reflecting surface gets bigger, a time required for the simulation gets longer as the total number of meshes increases. In order to shorten the time required for the simulation but this reduces an accuracy, the electronic warfare engagement simulation unit 30 lowers the total number of meshes as the frequency of the electromagnetic waves gets lower.

In conclusion, the total number of the meshes may increase as the frequency of the electromagnetic wave gets higher, and the total number of the meshes may decrease as a magnitude of the electromagnetic wave increases.

For example, as illustrated in FIG. 3A, when the electromagnetic wave is 20 MHz and has a wavelength of 15 m, an operation of an aircraft composed of a first number of meshes may be simulated. Alternatively, as illustrated in FIG. 3B, when the electromagnetic wave is 1 GHz and has a wavelength of $\lambda/5$, an operation of an aircraft composed of meshes of a second number which is higher than the first number may be simulated.

Since the number of meshes is changed according to the frequency characteristics of the electromagnetic wave, reflection loss and three-dimensional radiation pattern of the frequency of the aircraft can be easily analyzed, and phase information and magnitude information can be obtained faster.

The electronic warfare engagement simulation unit 30 may change at least one between a total number of the antennas and a disposed position of each antenna based on the total number of meshes constituting the aircraft.

For example, the electronic warfare engagement simulation unit 30 may arrange the antennas in an order starting from a point with a largest average value of angles formed by neighboring meshes. Accordingly, the antennas may be arranged at positions where the electromagnetic waves are collected the most.

The direction detecting simulation unit 40 may perform direction finding using the electromagnetic wave based on the plurality of antennas mounted on the aircraft to output direction finding result information.

The direction finding result information may include azimuth and elevation based on a position of the aircraft as illustrated in FIG. 6.

The direction finding simulation unit 40 may perform direction finding on a plurality of candidates in which the antennas are disposed at different positions in the aircraft. The plurality of antennas may be disposed at various positions in the aircraft, and each candidate is in a configuration in which at least one of the plurality of antennas is disposed differently.

The direction finding result information may include notification information notifying any one candidate in which a direction finding error is a minimum in the plurality of candidates.

The electronic warfare engagement simulation unit 30 may set at least one between the number of antennas and the disposed position of each antenna based on a user input, and may generate a candidate of either one corresponding to the user input to include the candidate in the plurality of candidates.

Meanwhile, the present disclosure may select an avionics electronic warfare direction finding measure of performance in consideration of an operational environment by using a simulator.

In detail, a method for controlling the avionics electronic warfare simulation apparatus is configured to select an electronic warfare optimized direction finding measure of performance based on a real operation.

The control method may include: generating data for evaluating platform influence of a frequency signal to perform direction finding; generating electronic warfare threat and aircraft operation simulation based on a military operational environment in the Korean Peninsula; generating direction finding performance elements on elevation and azimuth by receiving the data generated in the above step and by performing an engineering-level direction finding simulation function; simulating an electronic warfare engagement by interlocking and integrating the above steps to drive an engineering-level simulator and an engagement-level simulator; and storing and showing comprehensive information to derive an optimal arrangement of antennas on an aircraft platform and to analyze and evaluate the operation performance through an analysis on various direction finding algorithms and detection finding errors for each arrangement of antennas through the above interlocked simulation.

The control method may include newly constructing a direction finding measure of performance (MOP) of an avionics electronic warfare system by interlocking an engineering-level direction finding simulation function and an engagement-level electronic warfare simulation function.

The control method may select and provide an optimal direction finding antenna arrangement to a user through an analysis of direction finding errors based on an engagement-level simulation in consideration of an operational environment.

The control method provides an interlocking method in which phase data and magnitude data derived from the platform influence evaluation data generator through a network are combined with the frequency, received power, and signal-to-noise ratio signals derived from the electronic warfare threat and aircraft operation simulation unit, and the combined information is provided to the engineering-level direction finding simulation unit to receive elevation and azimuth as a result of the simulation.

According to the present disclosure, a necessary avionics electronic warfare support system fully reflecting power operation conditions and situation of the Korean military can be developed by quantitatively pre-analyzing and verifying the direction finding performance, which is a major measure of performance (MOP) in the electronic support (ES) field, based on the electronic warfare engagement-level simulation on which a real operation is reflected.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

What is claimed is:

1. An avionics electronic warfare simulation apparatus comprising:
   an electromagnetic wave generator that generates a virtual electromagnetic wave by using at least one of a plurality of electronic warfare threat models;
   an electronic warfare engagement simulation unit that simulates an operation of an aircraft according to a preset operation scenario to engage the electromagnetic wave and the aircraft based on the operation scenario;
   a direction finding simulation unit that performs direction finding using the electromagnetic wave based on a plurality of antennas mounted on the aircraft to output direction finding result information; and
   wherein the electronic warfare engagement simulation unit simulates an operation of the aircraft by changing a total number of meshes constituting the aircraft based on a characteristic of the electromagnetic wave.

2. The apparatus of claim 1, wherein the direction finding result information comprises azimuth and elevation based on a position of the aircraft.

3. The apparatus of claim 1, wherein the direction finding simulation unit performs direction finding on a plurality of candidates in which the antennas are disposed at different positions in the aircraft, and
   wherein the direction finding result information comprises notification information notifying any one candidate in which the direction finding error is a minimum in the plurality of candidates.

4. The apparatus of claim 3, wherein the electronic warfare engagement simulation unit sets at least one between a number of antennas and a disposed position of each antenna based on a user input, and generates a candidate of either one corresponding to the user input to include the candidate in the plurality of candidates.

5. The apparatus of claim 1, wherein the total number of meshes increases as a frequency of the electromagnetic wave increases.

6. The apparatus of claim 1, wherein the total number of meshes decreases as a magnitude of the electromagnetic wave increases.

7. The apparatus of claim 1, wherein the electronic warfare engagement simulation unit changes at least one between a total number of antennas and a disposed position of each antenna based on the total number of meshes constituting the aircraft.

8. The apparatus of claim 7, wherein the electronic warfare engagement simulation unit arranges the antennas in an order starting from a point with a largest average value of angles formed by neighboring meshes.

9. A method for controlling an avionics electronic warfare simulation apparatus, the method comprising:
   generating a virtual electromagnetic wave by using at least one of a plurality of electronic warfare threat models;
   simulating an operation of an aircraft according to a preset operation scenario to engage the electromagnetic wave and the aircraft based on the operation scenario; and
   outputting direction finding result information by performing direction finding using the electromagnetic wave based on a plurality of antennas mounted on the aircraft;
   wherein the simulating an operation of an aircraft according to a preset operation scenario to engage the electromagnetic wave and the aircraft based on the operation scenario comprises:
   changing a total number of meshes constituting the aircraft based on a characteristic of the electromagnetic wave; and
   simulating an operation of an aircraft according to the preset operation scenario by using the aircraft in which the total number of meshes is changed.

10. The method of claim 9, wherein the outputting direction finding result information comprises:
    performing direction finding on a plurality of candidates in which the antennas are disposed at different positions in the aircraft; and
    outputting direction finding result information on each of the plurality of candidates,
    wherein the direction finding result information comprises notification information notifying any one candidate in which the direction finding error is a minimum in the plurality of candidates.

11. The method of claim 9, further comprising:
    setting at least one between a number of antennas and a disposed position of each antenna based on a user input; and
    generating a candidate of either one corresponding to the user input to include the candidate in the plurality of candidates.

12. The method of claim 9, wherein the total number of meshes increases as a frequency of the electromagnetic wave increases.

13. The method of claim 9, wherein the total number of meshes decreases as a magnitude of the electromagnetic wave increases.

* * * * *